United States Patent
Low et al.

(10) Patent No.: US 9,752,048 B2
(45) Date of Patent: Sep. 5, 2017

(54) MULTILAYER COATING, PRODUCTION AND USE THEREOF FOR THE ADHESION OF GLASS PANES

(75) Inventors: Norbert Low, Neustadt/Aisch (DE); Jorn Lavalaye, Wurzburg (DE); Alexandra Steffens, Munster (DE)

(73) Assignee: BASF Coatings GmbH, Muenster (DE)

( * ) Notice: Subject to any disclaimer, the term of this patent is extended or adjusted under 35 U.S.C. 154(b) by 643 days.

(21) Appl. No.: 13/265,746

(22) PCT Filed: Apr. 21, 2010

(86) PCT No.: PCT/EP2010/002434
§ 371 (c)(1),
(2), (4) Date: Oct. 21, 2011

(87) PCT Pub. No.: WO2010/121794
PCT Pub. Date: Oct. 28, 2010

(65) Prior Publication Data
US 2012/0045632 A1   Feb. 23, 2012

(30) Foreign Application Priority Data

Apr. 21, 2009 (DE) .................. 10 2009 018 249

(51) Int. Cl.
| | | |
|---|---|---|
| B32B 37/12 | (2006.01) | |
| B32B 37/14 | (2006.01) | |
| B32B 27/42 | (2006.01) | |
| C09D 161/00 | (2006.01) | |
| B32B 17/10 | (2006.01) | |
| C08J 5/00 | (2006.01) | |

(52) U.S. Cl.
CPC ...... *C09D 161/00* (2013.01); *B32B 17/10036* (2013.01); *B32B 17/1055* (2013.01); *C08J 5/00* (2013.01); *Y10T 156/10* (2015.01); *Y10T 428/24975* (2015.01); *Y10T 428/264* (2015.01); *Y10T 428/265* (2015.01); *Y10T 428/2848* (2015.01)

(58) Field of Classification Search
USPC ............... 428/216, 354, 336, 335; 524/539; 427/207.1; 156/60
See application file for complete search history.

(56) References Cited

U.S. PATENT DOCUMENTS

| | | |
|---|---|---|
| 3,479,328 A | 11/1969 | Nordstrom et al. |
| 3,674,838 A | 7/1972 | Nordstrom |
| 4,126,747 A | 11/1978 | Cowherd, III et al. |
| 4,184,025 A | 1/1980 | Chattha |
| 4,279,833 A | 7/1981 | Culbertson et al. |
| 4,281,075 A | 7/1981 | Chattha |
| 4,315,053 A * | 2/1982 | Poth ................. C08G 63/20 427/388.3 |
| 4,340,497 A | 7/1982 | Knopf |
| 4,369,301 A | 1/1983 | Konig et al. |
| 4,504,372 A | 3/1985 | Kirchmayr et al. |
| 4,522,958 A | 6/1985 | Das et al. |
| 4,843,126 A | 6/1989 | Quinn |
| 5,102,961 A | 4/1992 | Blank |
| 5,112,931 A | 5/1992 | Potter et al. |
| 5,288,820 A | 2/1994 | Rector, Jr. et al. |
| 5,525,670 A | 6/1996 | Nishi et al. |
| 5,552,184 A | 9/1996 | Klostermann et al. |
| 5,741,552 A * | 4/1998 | Takayama ............ C09D 183/08 427/386 |
| 5,852,120 A * | 12/1998 | Bederke et al. ............... 525/124 |
| 5,852,137 A | 12/1998 | Hsieh et al. |
| 6,043,316 A | 3/2000 | St. Clair |
| 6,146,706 A | 11/2000 | Verardi et al. |
| 6,203,913 B1 * | 3/2001 | Kondos ................ C09D 161/20 428/423.1 |
| 6,204,332 B1 | 3/2001 | Wilfinger et al. |
| 6,649,734 B2 | 11/2003 | Campbell et al. |
| 2003/0190434 A1 | 10/2003 | Byers et al. |
| 2003/0232222 A1 | 12/2003 | Anderson et al. |
| 2004/0077778 A1 | 4/2004 | Hazan et al. |
| 2005/0100740 A1 | 5/2005 | Lin et al. |
| 2006/0147745 A1 | 7/2006 | Choi et al. |
| 2006/0188735 A1 | 8/2006 | Reising |
| 2007/0055038 A1 * | 3/2007 | Gimmnich et al. ............ 528/49 |
| 2007/0110902 A1 | 5/2007 | Johnson et al. |
| 2008/0076868 A1 | 3/2008 | Green et al. |
| 2009/0162592 A1 * | 6/2009 | Baikerikar et al. ............. 428/38 |

FOREIGN PATENT DOCUMENTS

| | | |
|---|---|---|
| CN | 1353646 A | 6/2002 |
| DE | 69406733 T2 | 3/1998 |

(Continued)

OTHER PUBLICATIONS

International Preliminary Report on Patentability for International application No. PCT/EP2010/002430 dated Nov. 1, 2011.

(Continued)

*Primary Examiner* — Tahseen N Khan
(74) *Attorney, Agent, or Firm* — Armstrong Teasdale LLP

(57) ABSTRACT

A multilayer coating comprising
(A) a multicoat paint system comprising
  (A1) at least one basecoat of a basecoat material comprising at least one melamine resin, and
  (A2) at least one clearcoat as the topmost coat of the multicoat paint system, and
(B) an adhesive layer of a moisture-curing, isocyanate-based adhesive directly atop the topmost clearcoat layer of the multicoat paint system,
wherein
(i) all amino resins present in the basecoat material are fully methylolated, fully etherified melamine resins in which at least 90% of the etherified methylol groups are etherified with butanol, and
(ii) the basecoat material contains at least 1.0% by weight, based on the total weight of the basecoat material, of at least one polyester binder having a hydroxyl number of at least 240 mg KOH/g and an acid number of not more than 10 mg KOH/g, and also a corresponding basecoat material and method of producing, and use of, the multilayer coating for adhesively bonding glass sheets.

16 Claims, No Drawings

(56) References Cited

FOREIGN PATENT DOCUMENTS

| | | |
|---|---|---|
| DE | 60223369 T2 | 9/2008 |
| EP | 0027719 A1 | 4/1981 |
| EP | 0086085 A2 | 8/1983 |
| EP | 0217385 A2 | 4/1987 |
| EP | 0377931 B1 | 11/1993 |
| EP | 0480959 B1 | 9/1994 |
| EP | 0787159 B1 | 12/1998 |
| EP | 1185568 B1 | 12/2002 |
| EP | 1173491 B1 | 12/2003 |
| EP | 1538171 A1 | 6/2005 |
| EP | 1940977 A2 | 7/2008 |
| GB | 148182 A | 1/1922 |
| WO | WO96/24619 A1 | 8/1996 |
| WO | WO99/42529 A1 | 8/1999 |
| WO | WO99/42531 A1 | 8/1999 |
| WO | WO01/25307 A1 | 4/2001 |
| WO | WO01/72909 A2 | 10/2001 |
| WO | WO01/81483 A2 | 11/2001 |
| WO | WO03/050194 A1 | 6/2003 |
| WO | WO03/089477 A1 | 10/2003 |
| WO | WO03/089487 A1 | 10/2003 |
| WO | WO2005/033233 A2 | 4/2005 |
| WO | WO2005/046889 A1 | 5/2005 |
| WO | WO2005/105938 A1 | 11/2005 |
| WO | WO2006/062666 A1 | 6/2006 |
| WO | WO2006/063304 A1 | 6/2006 |
| WO | WO2007/008635 A1 | 1/2007 |
| WO | WO2007/044774 A2 | 4/2007 |
| WO | WO2008/021712 A2 | 2/2008 |
| WO | WO2008/058590 A1 | 5/2008 |
| WO | WO2008/100548 A1 | 8/2008 |
| WO | WO2009/045466 A1 | 4/2009 |

OTHER PUBLICATIONS

International Preliminary Report on Patentability for International application No. PCT/EP2010/002434 dated Nov. 1, 2011.
International Preliminary Report on Patentability for International application No. PCT/EP2010/002439 dated Nov. 1, 2011.
International Search Report for International application No. PCT/EP2010/002430 dated Aug. 23, 2010.
International Search Report for International application No. PCT/EP2010/002434 dated Jan. 7, 2011.
International Search report for International application No. PCT/EP2010/002439 dated Sep. 3, 2010.
Written Opinion for International application No. PCT/EP2010/002430.
Written Opinion for International application No. PCT/EP2010/002434.
Written Opinion for International application No. PCT/EP2010/002439.
Cymel Resins, K Rayden, Inc., 9 pgs.
Resimene 755, Ineos Melamines, 2 pgs.

\* cited by examiner

MULTILAYER COATING, PRODUCTION AND USE THEREOF FOR THE ADHESION OF GLASS PANES

CROSS REFERENCE TO RELATED APPLICATIONS

This application is a National Phase Application of Patent Application PCT/EP2010/002434 filed on 21 Apr. 2010, which claims priority to DE102009018249.7, filed 21 Apr. 2010, both of which are hereby incorporated by reference in their entirety.

FIELD OF THE INVENTION

The invention relates to a multilayer coating, its production, and its use for adhesively bonding glass sheets, more particularly windshields, more particularly in the motor vehicle sector, and also to a basecoat material for producing the multicoat paint system.

PRIOR ART

Multicoat paint systems consisting of basecoat and clearcoat are widespread in the automobile industry. They are used on account of their outstanding profiles of properties, such as scratch, chemical, and weather resistance, and also high gloss.

The well-established solventborne coating materials, particularly the basecoat and clearcoat materials, and the single-coat or multicoat color and/or effect paint systems produced using them, have very good performance properties.

The constantly growing technical and esthetic demands of the market, particularly the demands of the automobile manufacturers and their customers, however, necessitate constant ongoing development of the hitherto attained technical and esthetic level.

In particular there is a need to provide new coating compositions which allow improvement in the adhesion of adhesives which are applied to the multicoat paint system, for the purpose, for example, of the bonding of windshields, to the multicoat paint system. At the same time, however, the advantages achieved by the known basecoat and clearcoat materials and the multicoat paint systems produced from them are not to be lost, but instead are to be retained at least to the same extent and preferably to a greater extent.

Windshields are typically bonded using a moisture-curing adhesive material based on polymers containing isocyanate groups to a body which is coated with a multicoat paint system. Motor Vehicle Safety Standards (MVSS) require this adhesive to have complete adhesion to the windshield and to the multicoat paint system. The skilled worker is aware that multicoat paint systems based on carbamate and melamine display a marked weakness with regard to glazing bond adhesion. It is therefore still usual within the automobile industry to apply a primer to the multicoat paint system as well, before the adhesive is applied. The use of an additional primer of this kind between multicoat paint system and adhesive gives rise to considerable additional costs arising out of the additional material and time requirements.

The adhesive can also be applied directly to the multicoat paint system without the use of a primer as a layer between multicoat paint system and adhesive (primerless process). The primerless process is presently being employed to an increased extent in the automobile sector, but necessitates precise operational monitoring, such as, for example, an extremely precise check on the film thicknesses of basecoat and clearcoat and on the times and temperatures of baking. Only such precise operational monitoring can ensure that the adhesives adhere adequately to the multicoat paint systems. Particularly in cases of excessive basecoat film thicknesses in combination with low clearcoat film thicknesses, there may be unwanted delamination of the glazing bonding compound from the multicoat paint system.

Optimizing the adhesion of glazing bonding to multicoat paint systems is generally accomplished by means of modifications in the clearcoat material. Examples of this are found in the patent publications below.

WO 2008/021712 A2 describes the use of an adhesion additive based on boric acid or a boric acid derivative and an ester. The use of these additives in a carbamate-melamine clearcoat material produces an improvement in the adhesion of glazing bonding.

US 2003/232222 A1 likewise describes the use of an additive based on boric acid and/or a boric acid derivative and an ester in one or both coats of the multicoat paint system for the purpose of improving the intercoat adhesion and the adhesion of glazing bonding.

WO 2007/008635 A1 describes a multicoat paint system, more particularly a clearcoat material, which comprises an additive whose functional groups exhibit little or no reaction with the polymeric binders or with the crosslinker. This additive accumulates in the interface region along the surface of the paint system, and results in enhancement of the intercoat adhesion or of the adhesion of glazing bonding. (Meth)acrylate esters or alpha-olefin-based polymers are described as being suitable additives. Adding the additive also provides advantages in respect of flow and of wetting, allowing wetting agents and flow additives to be omitted from the clearcoat material. For the purpose of enhancing the adhesion of glazing bonding, the additive is used in the clearcoat material.

WO 2006/063304 A1 describes the use of an additive based on a hydroxyl-functional epoxy polymer. This additive undergoes limited reaction with the functional groups in the clearcoat material, and accumulates in the interface region along the surface of the paint system, thereby enhancing the adhesion of glazing bonding.

WO 2003/050194 A1 describes a clearcoat material based on an acrylate polymer with secondary hydroxyl functionality and carbamate or urea functionality, and on a melamine-based crosslinker. In order to enhance the adhesion of glazing bonding, especially after condensation exposure, the clearcoat in the multicoat paint system comprises an additional constituent with carbamate or urea functionality. This constituent is obtainable from the reaction
1) of a compound having a primary carbamate group or a primary urea group and also a hydroxyl group with
2) a compound which is able to react with the hydroxl groups from 1) but which does not react with the carbamate or the urea groups from 1).

WO 2008/100548 A1 describes a clearcoat material based on a carbamate-functional polymer and a melamine resin. The adhesion of glazing bonding is optimized by using in both clearcoat and basecoat an adhesion promoter based on dibutyltin diacetate and butylphosphoric acid.

WO 2005/105938 A1 describes a clearcoat material based on an OH polyester and on a polyisocyanate crosslinker. Silane components of low molecular mass are used in the clearcoat for purposes including that of optimizing the adhesion of glazing bonding.

WO 2005/033233 A2 describes a clearcoat material based on a carbamate-functional polymer and on a melamine resin.

Silane components of low molecular mass are used in the clearcoat for purposes including that of optimizing the adhesion of glazing bonding.

Although the basecoat in the multicoat paint system may also affect the adhesion of glazing bonding, there are only a few publications where the aim of optimizing the adhesion of glazing bonding is pursued through modification of the basecoat material, as is shown below.

WO 2005/046889 A1 describes a multicoat paint system where the clearcoat material comprises silane groups. The advantageous effect of such silane components, however, is adversely affected, often greatly, when the typical alkyl- or aryl-phosphoric acid catalysts are used in the basecoat material. The document describes how, through the substitute use of a strong acid catalyst in the basecoat material, the effect of the silane component is adversely affected to less of an extent. Preference is given here to the use of epoxy-isocyanate-blocked catalysts, since, in contrast to amine-blocked catalysts, they result in a better appearance.

WO 2008/100548 A1 describes a clearcoat material based on a carbamate-functional polymer and a melamine resin. The adhesion of glazing bonding is optimized by using in both clearcoat and basecoat an adhesion promoter based on dibutyltin diacetate and butylphosphoric acid.

In the basecoat materials of multicoat paint systems it is usual to use melamine resins as crosslinkers in high proportions. Melamine resins, however, may exhibit layer migration and so lead to unwanted interactions with the adhesives that are used for glazing bonding. This is so in particular for the moisture-curing, isocyanate-based adhesives which are typically employed for glazing bonding on account of their outstanding profile of properties. This disruptive effect can be reduced by significantly lowering the proportion of melamine resin in the basecoat material. Such formulations, however, have an impaired appearance and also a significantly reduced solids content.

Unwanted interactions with the adhesives used for glazing bonding occur to a particularly increased extent if the multicoat paint system includes areas at which a relatively thick basecoat is covered by a relatively thin clearcoat. Because of the variations in the production operation, however, areas of this kind are hard to avoid particularly in the region of the windshield, since, owing to the construction of the coating line and the design of the automobile, it is very difficult to set a precise film thickness in the particular region of the windshield.

There was therefore a need to develop a multicoat paint system which, even in the case of a high basecoat and/or low clearcoat, and in the absence of an additional adhesion primer, exhibits a significant improvement with respect to the adhesion of glazing bonding, and which continues to have the same good processing properties, application properties, and, in particular, technological properties.

Problem

The problem on which the present invention is based, therefore, was that of providing a multilayer coating, composed of an adhesive layer and of a multicoat paint system featuring at least one basecoat material comprising melamine resin and at least one clearcoat material, said coating exhibiting improved adhesion of glazing bonding without using an additional adhesion primer. The intention in particular was to improve the adhesion of glazing bonding after condensation exposure as well. More particularly the multilayer coating is to exhibit good adhesion of glazing bonding even with a high basecoat film thickness and/or a low clearcoat film thickness, without the need for an additional adhesion primer.

A further problem for the invention was that of providing a basecoat material containing melamine resin that is suitable for producing a multilayer coating of this kind.

With the multilayer coating to be provided, however, the advantages obtained by the known basecoat and clearcoat materials and by the basecoats, clearcoats, and multicoat paint systems produced using them are not to be lost, but instead are to be retained at least to the same extent and preferably to a greater extent.

The corresponding multicoat paint systems shall therefore in particular exhibit very little haze, if any, good flow, and a very good overall visual appearance. Furthermore, the finishes shall be free from film defects, such as mud cracking, light/dark shading (clouds), and bittiness. Moreover, the finishes shall not contain any optical defects, such as sanding marks, for example, and shall exhibit good intercoat adhesion. In addition, the coating compositions shall exhibit good storage stability, i.e., even after storage of the coating compositions at 60° C. over 3 days, there shall be no significant deterioration in the properties either of the coating compositions or of the coatings produced from these stored coating compositions. Thus there shall be no deterioration in the rheological properties of the coating compositions, in particular no increase in viscosity, and no bittiness developed, and no impairment of hue or flow.

Solution

Surprisingly it has been found that the problem can be solved by a multilayer coating comprising
(A) a multicoat paint system comprising
    (A1) at least one basecoat of a basecoat material comprising at least one melamine resin, and
    (A2) at least one clearcoat as the topmost coat of the multicoat paint system, and
(B) an adhesive layer of a moisture-curing, isocyanate-based adhesive directly atop the topmost clearcoat layer of the multicoat paint system,
wherein
(i) all amino resins present in the basecoat material are fully methylolated, fully etherified melamine resins in which at least 90% of the etherified methylol groups are etherified with butanol, and
(ii) the basecoat material contains at least 1.0% by weight, based on the total weight of the basecoat material, of at least one polyester binder having a hydroxyl number of at least 240 mg KOH/g and an acid number of not more than 10 mg KOH/g.

The invention further provides a basecoat material comprising melamine resin for producing a multilayer coating, wherein
(i) all amino resins present in the basecoat material are fully methylolated, fully etherified melamine resins in which at least 90% of the etherified methylol groups are etherified with butanol, and
(ii) the basecoat material contains at least 1.0% by weight, based on the total weight of the basecoat material, of at least one polyester binder having a hydroxyl number of at least 240 mg KOH/g and an acid number of not more than 10 mg KOH/g.

Additionally found has been the use of a multilayer coating for adhesively bonding glass sheets to a substrate coated with the multilayer coating, comprising the steps of (a) coating the substrate with a multicoat paint system comprising
(A1) at least one basecoat of a basecoat material comprising at least one melamine resin, and
(A2) at least one clearcoat as the topmost coat of the multicoat paint system,
(b) curing the multicoat paint system, and
(c) applying an adhesive layer of a moisture-curing, isocyanate-based adhesive directly atop the topmost clearcoat layer of the multicoat paint system, and
(d) applying a glass sheet to the adhesive layer and curing the adhesive,
wherein
alternatively (i) all amino resins present in the basecoat material are fully methylolated, fully etherified melamine resins in which at least 90% of the etherified methylol groups are etherified with butanol,
or (ii) the basecoat material contains at least 1.0% by weight, based on the total weight of the basecoat material, of at least one polyester binder having a hydroxyl number of at least 240 mg KOH/g and an acid number of not more than 10 mg KOH/g,
or (iii) all of the amino resins present in the basecoat material are fully methylolated, fully etherified melamine resins in which at least 90% of the etherified methylol groups are etherified with butanol, and the basecoat material contains at least 1.0% by weight, based on the total weight of basecoat material, of at least one polyester binder having a hydroxyl number of at least 240 mg KOH/g and an acid number of not more than 10 mg KOH/g.

The multilayer coating of the invention is composed of an adhesive layer and of a multicoat paint system. The multicoat paint system comprises at least one basecoat of a basecoat material containing melamine resin, and at least one clearcoat. The adhesive layer is applied directly—that is, without an additional intermediate coat of adhesion primer—to the topmost clearcoat of the multicoat paint system.

As a result of the multilayer coating of the invention, improved adhesion of glazing bonding is achieved. In particular, there is also an improvement in the adhesion of glazing bonding following condensation exposure.

It was particularly surprising that, as a result of the multilayer coating of the invention, adhesion of glazing bonding is good even at a high basecoat film thickness and/or low clearcoat film thickness. This is so in particular even when there is no additional adhesion primer as an intermediate coat between clearcoat and adhesive.

With the multilayer coating of the invention, the advantages obtained by the known basecoat and clearcoat materials and by the basecoats, clearcoats, and multicoat paint systems produced using them are not lost. In particular, the multicoat paint systems of the multilayer coating of the invention have very little haze, if any, exhibit good flow, and also have a very good overall visual appearance. Furthermore, the finishes are free from film defects, such as mud cracking, light/dark shading (clouds), and bittiness. In addition, the finishes do not exhibit optical defects, such as sanding marks, for example, and have a good intercoat adhesion. Moreover, the coating compositions exhibit good storage stability—that is, even after storage of the coating compositions at 60° C. over 3 days, there is no significant deterioration in the properties either of the coating compositions or of the coatings produced from these stored coating compositions. Hence there is no deterioration in the rheological properties of the coating compositions, more particularly no increase in viscosity, and there are not bits formed and no impairment to the hue or flow.

Finally, the multilayer coatings of the invention and the multicoat paint systems that are used in the multilayer coatings of the invention meet the requirements that are typically imposed on an automobile finish.

DETAILED DESCRIPTION OF THE INVENTION

The subject matter of the present invention is evident from the independent claims. Preferred embodiments of the present invention are described in the dependent claims.

The invention first provides a multilayer coating comprising
(A) a multicoat paint system comprising
(A1) at least one basecoat of a basecoat material comprising at least one melamine resin, and
(A2) at least one clearcoat as the topmost coat of the multicoat paint system, and
(B) an adhesive layer of a moisture-curing, isocyanate-based adhesive directly atop the topmost clearcoat layer of the multicoat paint system,
wherein
(i) all amino resins present in the basecoat material are fully methylolated, fully etherified melamine resins in which at least 90% of the etherified methylol groups are etherified with butanol, and
(ii) the basecoat material contains at least 1.0% by weight, based on the total weight of the basecoat material, of at least one polyester binder having a hydroxyl number of at least 240 mg KOH/g and an acid number of not more than 10 mg KOH/g.

By a multilayer coating is meant a coating which comprises at least one multicoat paint system and an adhesive layer. The multilayer coating of the invention preferably comprises precisely one multicoat paint system (A) and precisely one adhesive layer (B).

By a multicoat paint system is meant a paint system which comprises at least one basecoat and at least one clearcoat. The multicoat paint system (A) of the multilayer coating of the invention comprises preferably one or two basecoats and precisely one clearcoat, more preferably precisely one basecoat (A1) and precisely one clearcoat (A2). The clearcoat (A2) is situated, without a further intermediate coat, directly on the basecoat (A1).

By a basecoat is meant a coating which has been obtained from a basecoat material, i.e., from a pigmented coating composition which is applied to a substrate.

By a clearcoat is meant a coating which has been obtained from a clearcoat material, i.e., from a transparent coating composition which is applied to a substrate.

Basecoat Material
Melamine Resins

Melamine resins are polycondensation resins formed from melamine (1,3,5-triazine-2,4,6-triamine) and a maximum of 6 mol of formaldehyde per mole of melamine. Some or all of the resulting methylol groups may be etherified with one or more different alcohols. Melamine resins may have different degrees of methylolation and different degrees of etherification.

The degree of methylolation of a melamine resin describes how many of the possible methylolation sites of the melamine have been methylolated, i.e., how many of the total of six hydrogen atoms of the primary amino groups of melamine (i.e., of 1,3,5-triazine-2,4,6-triamine) have been replaced by a methylol group. A fully methylolated mononuclear melamine resin, accordingly, has six methylol groups per triazine ring, such as hexamethylolmelamine, for example. The methylol groups may independently of one another also be in etherified form.

By the degree of etherification of a melamine resin is meant the proportion of methylol groups of the melamine resin that have been etherified with an alcohol. In the case of a fully etherified melamine resin, all of the methylol groups present are not free but are instead etherified with an alcohol. Monohydric or polyhydric alcohols are suitable for the etherification. It is preferred to use monohydric alcohols for the etherification. It is possible, for example, to use methanol, ethanol, n-butanol, isobutanol or else hexanol for the etherification. It is also possible to use mixtures of different alcohols, such as a mixture of methanol and n-butanol, for example.

Melamine resins may be monomeric (mononuclear) or oligomeric (polynuclear). The indication "mononuclear" or "polynuclear" refers to the number of triazine rings per molecule of melamine resin. One example of a mononuclear, fully methylolated, and fully butanol-etherified melamine resin is hexamethoxybutylmelamine.

As its amino resins, the basecoat material of the multilayer coating of the invention exclusively comprises fully methylolated, fully etherified melamine resins in which at least 90% of the etherified methylol groups are etherified with butanol. These melamine resins are also referred to in the context of the present invention as "predominantly butylated melamine resins". By predominantly butylated melamine resins, then, are meant melamine resins which are fully methylolated (i.e., in the mononuclear form contain six methylol groups per triazine ring), which, moreover, are fully etherified (i.e., all of the methylol groups are etherified with an alcohol), and in which, moreover, on average at least 90%, preferably at least 95%, more preferably at least 99% of the etherified methylol groups are etherified with butanol (n-butanol or isobutanol).

One preferred example of a predominantly butylated melamine resin is hexamethoxybutylmelamine (Cymel® 1156 from Cytec Specialties).

The group of predominantly butylated melamine resins does not include, in particular, melamine resins which are not fully methylolated, melamine resins which are not fully etherified, or melamine resins in which the fraction of the methylol groups etherified with butanol is less than 90%.

The basecoat material contains preferably 8% to 15% by weight of melamine resin, based on the total weight of the basecoat material.

It is essential to the invention that all of the amino resins present in the basecoat material are selected from the group of predominantly butylated melamine resins, i.e., from the group of fully methylolated, fully etherified melamine resins in which at least 90% of the etherified methylol groups are etherified with butanol. The basecoat material thus contains no amino resins other than the predominantly butylated melamine resin or resins. The basecoat material may where appropriate, however, contain further crosslinkers that are not amino resins, such as blocked isocyanates, for example. By amino resins are meant melamine resins, urea resins, and benzoguanamine resins.

Polyester Binders (PE)

The basecoat material contains preferably at least 1.0% by weight, based on the total weight of the basecoat material, of at least one polyester binder (PE) which has a hydroxyl number of at least 240 mg KOH/g and an acid number of not more than 10 mg KOH/g.

By polyester binders (PE) are meant polyester resins and polyester-polyurethanes.

The hydroxyl number is determined in accordance with DIN 53240 and relates to the solids content of the polyester binder. The hydroxyl number of said at least one polyester binder (PE) is preferably at least 270 mg KOH/g.

The acid number is determined in accordance with DIN 53402 and relates to the solids content of the polyester binder. The acid number of said at least one polyester binder (PE) is preferably not more than 5 mg KOH/g.

Said at least one polyester binder preferably has a hydroxyl number of 270 mg KOH/g to 300 mg KOH/g and an acid number of not more than 10 mg KOH/g.

The basecoat material contains preferably at least 1.0% by weight, more preferably 1% to 6% by weight, based in each case on the total weight of the basecoat material, of at least one polyester binder (PE) which has a hydroxyl number of at least 240 mg KOH/g and an acid number of not more than 10 mg KOH/g. Where the basecoat material contains more than 6% by weight, based on the total weight of the basecoat material, of said at least one polyester binder (PE) having a hydroxyl number of at least 240 mg KOH/g and having an acid number of not more than 10 mg KOH/g, stability problems may occur.

Suitable polyester binders (PE) may be saturated or unsaturated, especially saturated. Unsaturated polyester binders (PE) are those which contain at least one polymerizable carbon-carbon double bond. Saturated polyester binders (PE) are those which contain no polymerizable carbon-carbon double bond.

Said at least one polyester binder (PE) preferably has a weight-average molecular weight of 400 to 2500 g/mol. The molecular weight is determined by means of GPC analysis with THF (+0.1% of acetic acid) as eluent (1 ml/min) on a styrene-divinylbenzene column combination. Calibration is carried out with polystyrene standards. If polyester binders (PE) having a higher molecular weight are used, the solids content of the coating material is adversely affected.

As polyester binders (PE) it is preferred to use polyester resins. Polyester resins can be prepared by esterifying organic dicarboxylic acids or their anhydrides with organic diols, or may derive from a hydroxycarboxylic acid or a lactone. With particular preference the polyester resins are prepared by esterifying organic dicarboxylic acids or their anhydrides with organic diols. The particularly preferred polyester resins therefore comprise structural units which originate from aliphatic, cycloaliphatic and/or aromatic dicarboxylic and/or polycarboxylic acids and from diols and/or polyols. In order to prepare branched polyester resins it is possible to a small extent also to use polyols or polycarboxylic acids having a functionality of greater than 2. The dicarboxylic and/or polycarboxylic acids and diols and/or polyols may be linear or branched aliphatic, cycloaliphatic or aromatic dicarboxylic and/or polycarboxylic acids or diols and/or polyols.

Examples of diols suitable for preparing the polyester resins include alkylene glycols, such as ethylene glycol, propylene glycol, butylene glycol, butane-1,4-diol, hexane-1,6-diol, neopentylglycol, and other diols, such as dimethylolcyclohexane. It is also possible, however, to add small amounts of polyols, such as trimethylolpropane, glycerol or pentaerythritol, for example. The acid component of the polyester is composed primarily of low molecular weight dicarboxylic acids or their anhydrides having 2 to 44, preferably 4 to 36, carbon atoms in the molecule. Examples of suitable acids include o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, where they exist. In the formation of polyester polyols it is also possible to use relatively small amounts of carboxylic acids having 3 or more carboxyl groups, examples being trimellitic anhydrid or the adduct of maleic anhydride with unsaturated fatty acids.

It is also possible to use polyester diols which are obtained by reacting a lactone with a diol. They are notable for the presence of terminal hydroxyl groups and repeating polyester fractions of the formula ($-CO-(CHR^2)_n-CH_2-O$). In this formula, n is preferably 4 to 12 and the substituent $R^2$ independently at each occurence is hydrogen or an alkyl, cycloalkyl or alkoxy radical. Preferably, none of the substituents $R^2$ contains more than 12 carbon atoms. Examples are hydroxycaproic acid, hydroxybutyric acid, hydroxydecanoic acid and/or 12-hydroxystearic acid.

Preference for the preparation of the polyester diols is given to unsubstituted ε-caprolactone, in which n has a value of 4 and all of the $R^2$ substituents are hydrogen. The reaction with lactone is started by low molecular weight polyols such as ethylene glycol, 1,3-propanediol, 1,4-butanediol, and dimethylolcyclohexane. It is also possible, though, to react other reaction components, such as ethylenediamine, alkyldialkanolamines or else urea, with caprolactone. As higher molecular weight diols, suitability is also possessed by polylactam diols, which are prepared by reacting, for example, ε-caprolactam with low molecular weight diols.

Further Binders

The basecoat material, in addition to the polyester binder (PE) having a hydroxyl number of at least 240 mg KOH/g and an acid number of not more than 10 mg KOH/g, may also comprise further binders. The basecoat material preferably comprises at least one further binder.

Further binders that are suitable are, for example, random, alternating and/or block, linear and/or branched and/or comb (co)polymers of ethylenically unsaturated monomers, or polyaddition resins and/or polycondensation resins. For further details of these terms, refer to Römpp Lexikon Lacke and Druckfarben, Georg Thieme Verlag, Stuttgart, New York, 1998, page 457, "Polyaddition" and "Polyadditionsharze (Polyaddukte)" [Polyaddition Resins (Polyadducts)], and also pages 463 and 464, "Polykondensate" [Polycondensates], "Polykondensation" [Polycondensation], and "Polykondensationsharze" [Polycondensation resins], and also pages 73 and 74, "Bindemittel" [Binders].

Examples of suitable (co)polymers are (meth)acrylate (co)polymers or partially hydrolyzed polyvinyl esters, especially (meth)acrylate copolymers.

Examples of suitable polyaddition resins and/or polycondensation resins are polyesters other than the polyester binders (PE) having a hydroxyl number of at least 240 mg KOH/g and an acid number of not more than 10 mg KOH/g, alkyds, polyurethanes, polylactones, polycarbonates, polyethers, epoxy resin-amine adducts, polyureas, polyamides, polyimides, polyester-polyurethanes, polyetherpolyurethanes or polyester-polyether-polyurethanes, especially polyesters other than the polyester binders (PE) having a hydroxyl number of at least 240 mg KOH/g and an acid number of not more than 10 mg KOH/g.

Of these binders, particular advantages are possessed by the (meth)acrylate (co)polymers, which are therefore used with particular preference.

The (meth)acrylate notation encompasses acrylates, methacrylates, and mixtures thereof. The (co)polymer notation encompasses homopolymers and copolymers. The term (meth)acrylate (co)polymers therefore encompasses homopolymers and copolymers of acrylic acid and acrylic acid derivatives, methacrylic acid and methacrylic acid derivatives, and also, if desired, additional ethylenically unsaturated comonomers other than (meth)acrylic acid and derivatives thereof.

By acrylate binders (AC) are meant, therefore (meth) acrylate (co)polymers and derivatives obtained from (meth) acrylate (co)polymers by polymer-analogous reactions. Polymer-analogous reactions are reactions on macromolecules that are carried out with retention of the polymer character of the substrates. Their effect, therefore, is to convert one polymer into another. Polymer-analogous reactions are carried out generally via functional groups of the macromolecules. For further details of the term "polymer-analogous reaction", refer to Römpp Chemie Lexikon, $9^{th}$ edition 1995, volume PL-S, pages 3542-3543, entry heading "Polymeranaloge Reaktionen" [Polymer-analogous reactions].

The basecoat material contains preferably 10% to 30% by weight, more preferably 12% to 20% by weight, based in each case on the total weight of the basecoat material, of at least one acrylate binder (AC).

Suitability as acrylate binders (AC) is possessed by the acrylate binders that are typically used in basecoat materials in the automobile industry sector; the properties and hence the suitability of the binders for the basecoat material are controlled, in a manner known to the skilled worker, via the selection of the nature and amount of the constituent components used for preparing these binders.

Suitability as acrylate binder (AC) is possessed, for example, by random, alternating and/or block, linear and/or branched and/or comb (co)polymers of acrylic acid and/or methacrylic acid and also, if desired, additional ethylenically unsaturated monomers, and also compounds obtained from these (co)polymers by polymer-analogous reactions.

It is preferred to use acrylate binders (AC) having thio, hydroxyl, N-methylolamino, N-alkoxymethylamino, imino, carbamate, allophanate and/or carboxyl groups, preferably hydroxyl or carboxyl groups, on the one hand, and preferably crosslinking agents having anhydride, carboxyl, epoxy, blocked isocyanate, urethane, methylol, methylol ether, siloxane, carbonate, amino, hydroxy and/or beta-hydroxyalkylamide groups, preferably epoxy, beta-hydroxyalkylamide, blocked and nonblocked isocyanate, urethane or alkoxymethylamino groups, on the other.

In the case of self-crosslinking acrylate binders (AC) the binders contain, in particular, methylol, methylol ether and/or N-alkoxymethylamino groups.

Complementary reaktive functional groups which are especially suitable for use in the coating materials are hydroxyl groups on the one hand and blocked and non-blocked isocyanate, urethane or alkoxymethylamino groups on the other.

The functionality of the acrylate binders (AC) with respect to the above-described reactive functional groups may vary very widely and is guided in particular by the target crosslinking density and/or by the functionality of the particular crosslinking agents (V) employed. For example, in the case of hydroxyl-containing acrylate binders (AC), the OH number is preferably 15 to 300, more preferably 20 to 250, with particular preference 25 to 200, very preferably 30 to 150, and in particular 35 to 120 mg KOH/g by DIN 53240.

The complementary functional groups described above can be incorporated into the acrylate binders (AC) by the customary and known methods of polymer chemistry. This can be accomplished, for example, through the incorporation of monomers which carry corresponding reactive functional groups, and/or with the aid of polymer-analogous reactions.

Suitable acrylate binders (AC) generally have a weight-average molecular weight of 400 to 5000 g/mol. The molecular weight is determined by means of GPC analysis with THF (+0.1% of acetic acid) as eluent (1 ml/min) on a styrene-divinylbenzene column combination. Calibration is carried out with polystyrene standards. At relatively high molecular weights, the solubility of the acrylate binder (AC) may decrease, thus necessitating more solvent and lowering the solids content of the coating material. At relatively low molecular weights, technological problems may occur.

Suitable acrylate binders (AC) may be prepared by the methods known to the skilled worker, using corresponding olefinically unsaturated monomers with reactive functional groups, if desired in combination with monomers without reactive functional groups.

Examples of suitable olefinically unsaturated monomers with reactive functional groups are as follows:

a) Monomers which carry at least one hydroxyl, amino, alkoxymethylamino, carbamate, allophanate or imino group per molecule, such as
  hydroxyalkyl esters of acrylic acid, methacrylic acid or another alpha,beta-olefinically unsaturated carboxylic acid that derive from an alkylene glycol which is esterified with the acid or that are obtainable by reacting the alpha,beta-olefinically unsaturated carboxylic acid with an alkylene oxide such as ethylene oxide or propylene oxide, more particularly hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl or 4-hydroxybutyl acrylate, methacrylate, ethacrylate, crotonate, maleate, fumarate or itaconate; or hydroxycyclo-alkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters such as ε-caprolactone, for example, and these hydroxyalkyl or cycloalkyl esters;
  olefinically unsaturated alcohols such as allyl alcohol;
  polyols such as trimethylolpropane monoallyl or diallyl ether or pentaerythritol monoallyl, diallyl or triallyl ether;
  reaction products of acrylic acid and/or methacrylic acid with the glycidyl ester of an alpha-branched monocarboxylic acid having 5 to 18 C atoms per molecule, more particularly of a Versatic® acid, or, instead of the reaction product, an equivalent amount of acrylic and/or methacrylic acid, which is then reacted, during or after the polymerization reaction, with the glycidyl ester of an alpha-branched monocarboxylic acid having 5 to 18 C atoms per molecule, more particularly of a Versatic® acid;
  aminoethyl acrylate, aminoethyl methacrylate, allylamine or N-methyl-iminoethyl acrylate;
  N,N-di(methoxymethyl)aminoethyl acrylate or methacrylate or N,N-di(butoxymethyl)aminopropyl acrylate or methacrylate;
  (meth)acrylamides, such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)-(meth)acrylamide;
  acryloyloxy- or methacryloyloxy-ethyl, -propyl or -butyl carbamate or allophanate; further examples of suitable monomers which contain carbamate groups are described in the patent publications U.S. Pat. Nos. 3,479,328, 3,674,838, 4,126,747, 4,279,833 or 4,340,497.

b) Monomers which carry at least one acid group per molecule, such as
  acrylic acid, beta-carboxyethyl acrylate, methacrylic acid, ethacrylic acid, crotonic acid, maleic acid, fumaric acid or itaconic acid;
  olefinically unsaturated sulfonic or phosphonic acids or their partial esters;
  mono(meth)acryloyloxyethyl maleate, succinate or phthalate; or
  vinylbenzoic acid (all isomers), alpha-methylvinylbenzoic acid (all isomers) or vinylbenzenesulfonic acid (all isomers).

c) Monomers containing epoxide groups, such as the glycidyl ester of acrylic acid, methacrylic acid, ethacrylic acid, crotonic acid, maleic acid, fumaric acid or itaconic acid, or allyl glycidyl ether.

Monomers of the above-described kind that have a relatively high functionality are used generally in minor amounts. In the context of the present invention, minor amounts of monomers having a relatively high functionality are understood to be those amounts which do not lead to the crosslinking or gelling of the (meth)acrylate (co)polymers.

Examples of suitable olefinically unsaturated monomers without reactive functional groups include alkyl esters of acrylic acid, methacrylic acid or another alpha,beta-olefinically unsaturated carboxylic acid, vinylaromatic compounds, and mixtures of these monomers.

The basecoat material may be physically curing. In the context of the present invention the term "physical curing" denotes the curing of a layer of a coating composition by filming as a result of loss of solvent from the coating composition, with linking within the coating taking place via looping of the polymer molecules of the binders (regarding the term cf. Römpp Lexikon Lacke und Druckfarben, pages 73 and 74, entry heading "Bindemittel" [Binders]) or else filming takes place via the coalescence of binder particles (cf. Römpp Lexikon Lacke und Druckfarben, pages 274 and 275, entry heading "Härtung" [Curing]). Normally no crosslinking agents are needed for this. Where appropriate, the physical curing may be assisted by atmospheric oxygen, by heat or by exposure to actinic radiation.

The basecoat material may be thermally curable. In this case the binder may be self-crosslinking or externally crosslinking. In the context of the present invention the term "self-crosslinking" denotes the capacity of a binder to enter into crosslinking reactions with itself. A prerequisite for this is that the binders already contain both kinds of complementary reactive functional groups that are necessary for crosslinking, or else the binder contains reactive functional groups which are able to react "with themselves". Externally crosslinking coating compositions, on the other hand, are those in which one kind of the complementary reactive functional groups is present in the binder and the other kind is present in a crosslinking agent. For further details of this refer to Römpp Lexikon Lacke und Druckfarben, Georg Thieme Verlag, Stuttgart, New York, 1998, "Härtung" [Curing], pages 274 to 276, especially page 275, bottom.

Pigments

As a pigmented coating composition the basecoat material comprises at least one pigment (P).

Pigments are colorants in powder or platelet form which unlike dyes are insoluble in the surrounding medium (cf. Römpp Lacke und Druckfarben, page 451, entry heading "Pigmente" [Pigments]).

Preferably the pigment (P) is selected from the group consisting of organic and inorganic, color-imparting, effect-imparting, color- and effect-imparting, magnetically shielding, electrically conductive, corrosion-inhibiting, fluorescent, and phosphorescent pigments. Preference is given to using the color and/or effect pigments.

With particular preference the basecoat material comprises at least one effect pigment, more particularly at least one metal flake pigment. Together with the effect pigment or pigments, the basecoat may further comprise at least one, or two or more, color pigments.

Examples of suitable effect pigments, which may also impart color, are metal flake pigments, such as commercial aluminum bronzes and commercial stainless steel bronzes, and also nonmetallic effect pigments, such as, for example, pearlescent pigments and interference pigments, platelet-shaped effect pigments based on iron oxide, or liquid-crystalline effect pigments. For further details refer to Römpp Lexikon Lacke und Druckfarben, page 176, entry heading "Effekt pigments" [Effect pigments] and pages 380 and 381, entry headings "Metalloxid-Glimmer-Pigmente" [Metal oxide-mica pigments] to "Metallpigmente" [Metallic pigments].

Use is made in particular of commercial aluminum bronzes. In this context, both untreated types, which are available commercially, for example, under the name Stapa® Metallux from Eckart and treated types, especially silanized types, which are described, for example, in WO 01/81483 and are available commercially, for example, under the name Hydrolan® from Eckart, are used.

Preferably the metal flake pigment has a thickness of 200 to 2000 nm and in particular 500 to 1500 nm.

The metal flake pigment preferably has an average particle size of 10 to 50 and more particularly 13 to 25 µm (ISO 13320-1 by Cilas (instrument 1064)).

Suitable organic and/or inorganic color pigments are the pigments typically employed in the paint industry.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxid, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details refer to Römpp Lexikon Lacke and Druckfarben, Georg Thieme Verlag, 1998, pages 180 and 181, entry headings "Eisenblau-Pigmente" [Iron blue pigments] to "Eisenoxidschwarz" [Black iron oxide], pages 451 to 453, entry headings "Pigmente" [Pigments] to "Pigmentvolumenkonzentration" [Pigment volume concentration], page 563, entry heading "Thioindigo-Pigmente" [Thioindigo pigments], page 567, entry heading "Titandioxid-Pigmente" [Titanium dioxide pigments], pages 400 and 467, entry heading "Natürlich vorkommende Pigmente" [Naturally occurring pigments], page 459, entry heading "Polycyclische Pigmente" [Polycyclic pigments], page 52, entry headings "Azomethinpigmente" [Azomethine pigments], "Azopigmente" [Azo pigments], and page 379, entry heading "Metallkomplex-Pigmente" [Metal complex pigments].

The amount of the pigments may vary very widely and is guided primarily by the depth of color and/or intensity of effect that are to be brought about, and also by the dispersibility of the pigments in basecoat materials. In the case of solid-color basecoat materials, based in each case on the total weight of the basecoat material, the pigment content is preferably 0.5 to 60% by weight, more preferably 1% to 50% by weight. Solid-color basecoat materials are basecoat materials which contain no metallic or effect pigments. In the case of metallic coating materials, based in each case on the total weight of the basecoat material, the pigment content is preferably 0.5% to 40% by weight, more preferably 0.5 to 35% by weight, with particular preference 1% to 30% by weight.

Organic Solvents (L)

The basecoat material contains typically 30% to 70% by weight, based on the total weight of the basecoat material, of at least one organic solvent (L).

Preferably the basecoat material contains 38% to 65% by weight, more preferably 40% to 60% by weight, based in each case on the total weight of the basecoat material, of at least one organic solvent (L).

Suitable organic solvents (L) are all solvents which are typically used in the paint industry, examples being alcohols, glycol ethers, esters, ether esters, and ketones, aliphatic and/or aromatic hydrocarbons, such as, for example, acetone, methyl isobutyl ketone, methyl ethyl ketone, butyl acetate, 3-butoxy-2-propanol, ethyl ethoxypropionate, butylglycol, butylglycol acetate, butanol, dipropylene glycol methyl ether, butyl glycolate, xylene, toluene, Shellsol T, Pine Oel 90/95, Solventnaphtha®, Shellsol® A, Solvesso, benzine 135/180, and the like.

Through the amount of organic solvent (L) the viscosity of the basecoat material can be influenced. The amount of organic solvent (L) is preferably chosen such that the basecoat material at 23° C. has a viscosity of 16 s to 35 s, preferably 18 to 25 s, flow time in the Ford 3 cup. In the present specification, a viscosity of this kind of 16 s to 35 s, preferably 18 to 25 s, as the flow time in the Ford 3 cup at 23° C. is referred to generally as "spray viscosity".

Through the amount of organic solvent (L) the solids content of basecoat material as well is influenced. The amount of organic solvent (L) in the basecoat material is preferably chosen such that the basecoat material has a solids content of at least 30% by weight. The solids content of the basecoat material is determined in accordance with DIN ISO 3251 with an initial mass of 1.0 g over a test duration of 60 minutes at a temperature of 125° C.

The basecoat material is water-free. A water-free basecoat material is a basecoat material which is fully or substantially free of water.

Catalyst

So that a polymeric, chemically resistant network can form from the monomeric and/or oligomeric constituents when baking temperatures are lowered and/or baking times made shorter, the basecoat material comprises at least one catalyst. Suitable catalysts are the known catalysts which are typically used for crosslinking with melamine resins, such as, for example, sulfonic acid catalysts or phosphoric acid derivatives such as diphenyl phosphite. The catalyst or catalysts are used in the customary and known amounts, for example, 0.5% to 5% by weight, based on the total weight of the basecoat material.

The basecoat material preferably contains 1% to 3% by weight, based on the total weight of the basecoat material, of at least one sulfonic acid catalyst. More preferably the basecoat material contains 1.2% to 2.8% by weight, very preferably 1.4% to 2.6% by weight, based in each case on the total weight of the basecoat material, of at least one sulfonic acid catalyst.

Examples of suitable sulfonic acid catalysts are dodecylbenzenesulfonic acid (DDBSA), dinonylnaphthalenedisulfonic acid (DNNSA), para-toluenesulfonic acid (p-TSA), and also blocked sulfonic acid catalysts such as blocked DDBSA, blocked DNNSA or blocked p-TSA.

The basecoat material preferably comprises a blocked sulfonic acid catalyst.

As blocked sulfonic acid catalysts it is preferred to use amine-blocked or covalently blocked sulfonic acid catalysts in order to ensure the stability and durability of the coating systems. The sulfonic acid catalysts are therefore preferably blocked using tertiary alkylated amines or heterocyclic amines, such as 2-amino-2-methylpropanol, diisopropanolamine, dimethyloxazolidine or trimethylamine, for example. Covalently bonding blocking agents employed are, for example, epoxy compounds or epoxy-isocyanate compounds. Blocked sulfonic acid catalysts of this kind are described in detail in patent publication U.S. Pat. No. 5,102,961.

Further Constituents of the Basecoat Material

Besides the components described above, the basecoat material may comprise customary and known auxiliaries and additives in typical amounts, preferably 0% to 40% by weight, more preferably 0.5% to 30% by weight, based in each case on the total weight of the basecoat material, of at least one auxiliary or additive (Z).

Suitable auxiliaries or additives (Z) are the known auxiliaries and additives that are typically used in the paint industry. Examples of suitable auxiliaries and additives are organic and inorganic fillers, such as talc, and/or dyes (organic substances that are black or chromatic and are soluble in the surrounding medium (cf. Römpp Lacke and Druckfarben, page 221, entry heading "Farbmittel" [Colorants])), and also further customary auxiliaries and additives, such as, for example, antioxidants, deaerating agents, wetting agents, dispersants, emulsifiers, rheological assistants such as flow control agents, thickeners, antisag agents, and thixotropic agents, waxes and waxlike compounds, slip additives, reactive diluents, free-flow aids, siccatives, biocides, additives for improving the substrate wetting, additives for improving the surface smoothness, matting agents, free-radical scavengers, light stabilizers, preferably UV absorbers with an absorption maximum below 370 nm and/or HALS, corrosion inhibitors, flame retardants or polymerization inhibitors, as described in detail in the book "Lackadditive" [Additives for Coatings] by Johan Bieleman, Wiley-VCH, Weinheim, New York, 1998. Preferred auxiliaries and additives are rheological assistants, deaerating agents, wetting agents, dispersants, waxes and waxlike compounds, UV absorbers, and free-radical scavengers. Particularly preferred auxiliaries and additives are UV absorbers, wetting agents, and waxes and waxlike compounds.

The invention further provides a basecoat material comprising melamine resin for producing a multilayer coating, wherein (i) all amino resins present in the basecoat material are fully methylolated, fully etherified melamine resins in which at least 90% of the etherified methylol groups are etherified with butanol, and (ii) the basecoat material contains at least 1.0% by weight, based on the total weight of the basecoat material, of at least one polyester binder having a hydroxyl number of at least 240 mg KOH/g and an acid number of not more than 10 mg KOH/g.

Clearcoat Material

The multilayer coating of the invention comprises at least one clearcoat (A2). This clearcoat (A2) forms the topmost layer of the multicoat paint system, which is followed by the adhesive layer (B).

Suitable clearcoat material for producing the clearcoat of the multilayer coating of the invention comprises the transparent coating compositions that are typically employed, with an amino resin fraction of <20% by weight, based on the solids fraction of the transparent coating composition such as, for example, typically employed aqueous or solventborne transparent coating compositions, which may be formulated either as one-component coating compositions or as two-component or multicomponent coating compositions. Suitability is also possessed, furthermore, by powder slurry clearcoat materials.

Suitable transparent coating compositions are described for example in WO 03/050194 A1, in US 2008/076868 A1, and in WO 06/063304 A1. It is preferred to use transparent coating compositions containing carbamate groups.

The transparent coating compositions (clearcoat materials) preferably have a solids fraction of at least 50% by weight. The transparent coating compositions used may be curable thermally and/or by means of radiation, in particular by means of UV radiation.

The transparent coating compositions typically comprise at least one binder with functional groups and also at least one crosslinker having a functionality which is complementary to the functional groups of the binder. Examples of such complementary functionalities are in particular the following pairings (a/b) that are in each case complementary to one another: (carboxyl/epoxy), (amine or thiol or hydroxyl/blocked or free isocyanate or alkoxylated amino groups or transesterifiable groups), ((meth)acryloyl/CH-acidic or amine or hydroxyl or thiol), (carbamate/alkoxylated amino groups), and ((meth)acryloyl/(meth)acryloyl).

Use is made in particular of transparent coating compositions based on polyurethane resins and/or polyacrylate resins and/or polyester resins, preferably with hydroxyl, amino, carbamate, carboxyl, (meth)acryloyl and/or thiol groups, in combination with the corresponding crosslinkers, more particularly in combination with isocyanates, amino resins, anhhydrides, and the like.

Besides the binder and crosslinker, the transparent coating compositions comprise customary auxiliaries and additives, such as, for example, catalysts for crosslinking, defoamers, adhesion promoters, additives for improving substrate wetting, additives for improving surface smoothness, matting agents, light stabilizers, preferably UV absorbers with an absorption maximum below 370 nm and/or HALS, corrosion inhibitors, biocides, flame retardants or polymerization inhibitors, as described in detail in the book "Lackadditive" by Johan Bieleman, Wiley-VCH, Weinheim, New York, 1998.

Adhesive

The multilayer coating of the invention comprises an adhesive layer (B) of a moisture-curing, isocyanate-based adhesive. The adhesive layer (B) is located directly on the clearcoat (A2), forms the topmost coat of the multicoat paint system (A). Consequently, there is in particular no intermediate layer of adhesion primer between the multicoat paint system and the adhesive layer.

The adhesive layer (B) is produced by applying a moisture-curing, isocyanate-based adhesive to the clearcoat (A2). Suitable adhesives are described for example in patent U.S. Pat. No. 5,852,137. Particularly suitable are the moisture-curing, isocyanate-based adhesives that are typically used for the adhesive bonding of windshields. Adhesives of this kind may be obtained commercially, for example, under the name "Betaseal®" from Dow Automotive. Moisture-curing, isocyanate-based adhesives (polyurethane adhesives) can be used in general as 1-component (1K) adhesives or else as 2-component (2K) adhesives. Particular preference is given to using moisture-curing, isocyanate-based 1K adhesives.

Layer Construction of the Multilayer Coating

The multilayer coating of the invention comprises a multicoat paint system (A) and an adhesive layer (B). The adhesive layer is sited, without a further intermediate layer, directly on the topmost layer of the multicoat paint system. The topmost layer of the multicoat paint system is a clearcoat (A2). In addition to the clearcoat (A2), the multicoat paint system comprises at least one basecoat (A1). Preferably the multicoat paint system of the multilayer coating of the invention has precisely one basecoat (A1) and precisely one clearcoat (A2), the clearcoat (A2) being sited, without a further intermediate layer, directly atop the basecoat (A1).

The multicoat paint system may comprise further coats. More particularly the multicoat paint system may comprise a further basecoat which is located on the side of the basecoat (A1) that faces away from the clearcoat (A2). Suitability as a further basecoat in this 3-coat system is possessed by all of the basecoats that are customary for this purpose in automotive finishing.

Production of the Multilayer Coating

The invention further provides a method of producing a multilayer coating, comprising the steps of
 (a) coating a substrate with a multicoat paint system comprising
  (A1) at least one basecoat of a basecoat material comprising at least one melamine resin, and
  (A2) at least one clearcoat as the topmost coat of the multicoat paint system,
 (b) curing the multicoat paint system, and
 (c) applying an adhesive layer of a moisture-curing, isocyanate-based adhesive directly atop the topmost clearcoat layer of the multicoat paint system,
 wherein
  (i) all amino resins present in the basecoat material are fully methylolated, fully etherified melamine resins in which at least 90% of the etherified methylol groups are etherified with butanol, and
  (ii) the basecoat material contains at least 1.0% by weight, based on the total weight of the basecoat material, of at least one polyester binder having a hydroxyl number of at least 240 mg KOH/g and an acid number of not more than 10 mg KOH/g.

The multilayer coating of the invention may be produced on any desired substrates. The substrates may be composed of any of a very wide variety of materials and combinations of materials. Preferably they are composed of metals, plastics and/or glass, more preferably of metal and/or plastic. With very particular preference the substrate is part of an automobile body.

The substrates are typically provided with a primer and, if desired, with a surfacer, which are applied by the customary techniques, such as electrodeposition coating, dipping, knife coating, spraying, rolling or the like. The primer is preferably at least partly or fully cured before the at least one basecoat material of the multicoat paint system is applied. The primer and/or the surfacer are/is typically cured by heating to a temperature between 80 and 170° C. for a time of 3 to 30 minutes.

In the method of the invention for producing a multilayer coating, first a multicoat paint system (A) and subsequently an adhesive layer (B) are applied to the uncoated or precoated substrate.

To produce the multicoat paint system (A), in this order, first at least one basecoat (A1) comprising a basecoat material, and subsequently at least one clearcoat (A2) comprising a clearcoat material, are applied to an uncoated or precoated substrate.

Basecoat and clearcoat materials may be applied by means of customary techniques for applying liquid coating compositions, such as dipping, knife coating, spraying, rolling or the like, for example, but particularly by means of spraying. It is preferred to employ spray application methods, such as, for example, compressed air spraying, airless spraying, high-speed rotation, electrostaticr spray application (ESTA), alone or in conjunction with hot spray application such as, for example, hot air spraying. It is particularly advantageous to apply the basecoat material in a first pass by ESTA and in a second pass pneumatically.

Prior to the application of the clearcoat material, the at least one applied basecoat film is typically flashed off briefly or dried briefly, generally at a temperature between 30 and less than 100° C. for a time of 1 to 15 minutes. Thereafter the clearcoat material can be applied (wet-on-wet method).

Basecoat material and clearcoat material are jointly cured thermally. Where the clearcoat material is also curable with actinic radiation as well, an aftercure takes place by exposure to actinic radiation. Curing may take place after a certain rest time. It may have a duration of 30 seconds to 2 hours, preferably 1 minute to 1 hour, and more particularly 1 to 45 minutes. The rest time is used, for example, for the flow and for the degassing of the coating films, or for the evaporation of volatile constituents. The rest time may be shortened and/or assisted through the application of elevated temperatures of up to 90° C. and/or through a reduced humidity (<10 g water/kg air), provided this does not entail any damage or change to the coating films, such as premature complete crosslinking, for instance.

The curing of the multicoat paint system takes place usually at a temperature between 90 and 160° C. for a time of 15 to 90 minutes.

For the drying or conditioning of the wet basecoat film or films and of the wet clearcoat film or films it is preferred to use thermal and/or convection processes, in which case customary and known apparatus is used, such as tunnel ovens, NIR and IR heating lamps, fans, and blowing tunnels. These types of apparatus may also be combined with one another.

With the multicoat paint systems of the multilayer coating of the invention, the basecoat (A1) generally has a dry film thickness of 3 to 40 μm, advantageously of 5 to 30 μm, more advantageously still of 10 to 25 μm, and more preferably of 15 to 25 μm.

In the multicoat paint systems of the multilayer coating of the invention, the clearcoat (A2) generally has a dry film thickness of 10 to 120 μm, preferably of 20 to 80 μm, in particular of 25 to 50 μm, and more preferably of 25 to 45 μm.

Preferably, the multilayer coating of the invention comprises precisely one basecoat having a dry film thickness of 10 to 25 μm and precisely one clearcoat having a dry film thickness of 25 to 70 μm.

In order to produce the adhesive layer (B), a moisture-curing, isocyanate-based adhesive is applied directly, i.e., without a further intermediate coat, atop the topmost clearcoat layer of the cured, cooled multicoat paint system (A). The moisture-curing, isocyanate-based adhesive may be applied by means of the customary and suitable methods, such as spraying, for example, and in the customary adhesive layer thicknesses of 0.1 to 5 mm.

Use of the Multilayer Coating

The invention further provides for the use of a multilayer coating for adhesively bonding glass sheets to a substrate coated with the multilayer coating, comprising the steps of
  (a) coating the substrate with a multicoat paint system comprising
    (A1) at least one basecoat of a basecoat material comprising at least one melamine resin, and
    (A2) at least one clearcoat as the topmost coat of the multicoat paint system,
  (b) curing the multicoat paint system, and
  (c) applying an adhesive layer of a moisture-curing, isocyanate-based adhesive directly atop the topmost clearcoat layer of the multicoat paint system, and
  (d) applying a glass sheet to the adhesive layer and curing the adhesive,
  wherein
  alternatively (i) all amino resins present in the basecoat material are fully methylolated, fully etherified melamine resins in which at least 90% of the etherified methylol groups are etherified with butanol,
  or (ii) the basecoat material contains at least 1.0% by weight, based on the total weight of the basecoat material, of at least one polyester binder having a hydroxyl number of at least 240 mg KOH/g and an acid number of not more than 10 mg KOH/g,
  or (iii) all of the amino resins present in the basecoat material are fully methylolated, fully etherified melamine resins in which at least 90% of the etherified methylol groups are etherified with butanol, and the basecoat material contains at least 1.0% by weight, based on the total weight of basecoat material, of at least one polyester binder having a hydroxyl number of at least 240 mg KOH/g and an acid number of not more than 10 mg KOH/g.

In one preferred embodiment all of the amino resins present in the basecoat material are selected from the group of predominantly butylated melamine resins, i.e., from the group of the fully methylolated, fully etherified melamine resins in which at least 90% of the etherified methylol groups are etherified with butanol, and the basecoat material contains at least 1.0% by weight, based on the total weight of basecoat material, of at least one polyester binder having a hydroxyl number of at least 240 mg KOH/g and an acid number of not more than 10 mg KOH/g.

Preferably the substrate is part of an automobile body.

By "adhesive bonding" is meant the long-term affixing of a glass sheet on or to the substrate by means of the multilayer coating of the invention.

Suitable glass sheets include all customary and known glass sheets. The glass sheet is preferably a windshield.

The steps (a) coating the substrate with the multicoat paint system, (b) curing the multicoat paint system, and (c) applying an adhesive layer are subject to the remarks already made above.

In the case of step (d) "applying a glass sheet to the adhesive layer and curing the adhesive", the procedure adopted may be as follows. The cleaned glass sheet is applied to the freshly applied adhesive layer, and is fixed and pressed on. Given a sufficient atmospheric humidity, the curing of the adhesive may be carried out at room temperature. The curing of the adhesive may take place, for example, at a humidity of 50% relative humidity and at a temperature of 25° C. over 72 hours.

EXAMPLES

In the Examples the acid number (AN) is determined in accordance with DIN 53402 and the OH number (hydroxyl number) in accordance with DIN 53240.

The solids content is determined in general in accordance with DIN ISO 3251, with an initial mass of 1.0 g over a test period of 60 minutes at a temperature of 125° C. These parameters apply consistently unless, in any given case, values different from these are specified for individual parameters.

1. Preparation of a Wax Dispersion (W)

6.0 parts by weight of the polyethylene wax EVA 1 from BASF AG (commercial polyethylene wax based on an ethylene/vinylacetate copolymer having a melting point of 87-92° C., an Ubbelohde drop point of around 95° C. and a mass-average molecular weight of around 6500 g/mol) and 40.0 parts by weight of xylene are dissolved with slow stirring at 100° C. With further stirring the solution is cooled to 70° C. and slowly 54.0 parts by weight of butyl acetate (technical grade, around 85% purity) are added, and desired precipitation of wax begins. With further stirring the dispersion is cooled further down to 35° C.

2. Preparation of Polymer Microparticles (M)

The preparation of polymer microparticles starts with the preparation of a carrier resin. For this purpose a reactor is charged with 5.8 parts by weight of xylene, 5.8 parts by weight of toluene, and 0.2 part by weight of methanesulfonic acid, and this initial charge is heated to 104° C. Subsequently the reactor is supplied with 80.6 parts by weight of 12-hydroxystearic acid and the reaction mixture is boiled under reflux at 171° C. with withdrawal of the water of reaction. When an acid number of 35 mg KOH/g is reached, based on the solids content of the product (1 h/130° C.), the reaction is at an end. After cooling has taken place, the solids content is adjusted to 80% using 8.0 parts by weight of solvent naphtha, based on the total weight of the carrier resin solution.

In a second step a reactor is charged with 43.2 parts by weight of solvent naphtha, 0.08 part by weight of N,N-dimethylcocosamine, and 1.0 part by weight of ethyl acetate and this initial charge is heated to 104° C. Added to the reactor at a pressure of 0.69 bar over the course of 2 hours are, simultaneously, a monomer mixture consisting of 27.6 parts by weight of methyl methacrylate, 3.8 parts by weight of 2-hydroxypropyl methacrylate, 0.8 part by weight of glycidyl methacrylate, 12.8 parts by weight of the above-described carrier resin solution, 1.5 parts by weight of methacrylic acid, and 1.5 parts by weight of octyl mercaptan, and an initiator mixture consisting of 2.3 parts by weight of tert-butyl peroxy-2-ethylhexanoate and 5.1 parts by weight of solvent naphtha. The mixture is subsequently held for 3 hours at the above-stated temperature and pressure, then cooled and adjusted to a solids content of 41.0% using solvent naphtha.

3. Preparation of an Acrylate Binder (AC)

A reactor is charged with 13.2 parts by weight of Solvesso 100 and this initial charge is heated to 167° C. Added to the reactor at a pressure of 0.35 bar and over a time of 4 hours, simultaneously, are a monomer mixture consisting of 2.1 parts by weight of acrylic acid, 10.8 parts by weight of hydroxyethyl acrylate, 11.5 parts by weight of 2-ethylhexyl acrylate, 11.5 parts by weight of butyl acrylate, and 14.3 parts by weight of styrene, and an initiator mixture consisting of 0.7 part by weight of di-tert-butyl peroxide and 11.1 parts by weight of a solution of dicumyl peroxide in Solvesso 100 (50% strength). The mixture is then maintained at the above-stated temperature and pressure for one hour, after which, over a period of 1 hour, 21.5 parts by weight of ε-caprolactone are added. The mixture is cooled to 150° C. and held for 1.5 hours at a pressure of 0.35 bar. It is cooled and adjusted to a solids content of 75% using Solvesso 100. The resulting acrylate resin has an acid number of 23 mg KOH/g and an OH number of 73 mg KOH/g, based in each case on the solids content.

4. Preparation of Stabilized Inorganic Particles (N)

In a receiver vessel, 10.0 parts by weight of the acrylate binder (AC) described under 3., 6.0 parts by weight of Degussa Aerosil® 380 (commercial hydrophilic fumed silica from Degussa AG with a specific surface area (BET) of 380 m²/g, an average primary particle size of 7 nm, and an $SiO_2$ content of at least 99.8% by weight, based on the calcined substance), 41.7 parts by weight of solvent naphtha, 41.7 parts by weight of butyl acetate, and 0.6 part by weight of a fatty acid ester as stabilizer (S), with a nonvolatile fraction of 96.2% (in 2 hours at 130° C.), an OH number of 50 mg KOH/g, and an acid number of 17.2 mg KOH/g, based in each case on the 130° C. solids content, containing 6-hydroxycaproic acid, hydroxyvaleric acid, lauric acid, and polyethylene glycol (for example, the commercial wetting additive based on fatty acid esters, Solsperse 39000 from Th. Goldschmidt), are mixed and dispersed.

5. Preparation of the Polyester Binder (PE)

A mixture of 36.6 parts by weight of dicarboxylic acid mixture, 27.8 parts by weight of hexanediol, and 35.6 parts by weight of cyclohexanedimethanol is charged to a stirred vessel equipped with a water separator, and this initial charge is heated to 230° C. with stirring under a nitrogen atmosphere. The water released in the course of this procedure is collected in a water separator. The reaction mixture is held at 230° C. until the acid number falls below a value of 4 mg KOH/g. The resulting mixture has a solids content of 90.0% and a viscosity of 380 mPas (at 50° C.). The resulting polyester has an acid number of 2.2 mg KOH/g and an OH number of 280 mg KOH/g, based in each case on the solids content.

6. Preparation of a CAB Solution (C)

In a receiver vessel, 76.0 parts by weight of butyl acetate are mixed with 24.0 parts by weight of CAB 551-0.2 (commercial cellulose acetobutyrate from Eastman) for 30 minutes.

7. Preparation of a Paste of an Aluminum Effect Pigment

The paste is prepared from 50.0 parts by weight of a commercial nonleafing aluminum effect pigment paste of the silver dollar type having an average particle size of 14 μm (Metallux 2192 from Eckart) and 50.0 parts by weight of butyl acetate with stirring.

8. Preparation of the Comparative Metallic Basecoat Material BC-1 (without Polyester and with Hydrophilic Melamine)

The comparative metallic basecoat material BC-1 is prepared by mixing and homogenizing the following constituents:

10.0 parts by weight of the wax dispersion (W) described under 1, 22.0 parts by weight of the polymer microparticles (M) described under 2, 11.5 parts by weight of Resimene® 755 (commercial monomeric hydrophilic hexamethoxy-methyl/butyl-melamine resin from Ineos Melamines), 4.0 parts by weight of the stabilized inorganic particles (N) described under 4, 0.5 part by weight of a commercial, silicone-free wetting additive based on an amine resin-modified acrylic copolymer, 0.8 part by weight of a commercial, hydroxyphenyl-benzotriazole-based UV absorber, 22.0 parts by weight of the acrylate binder (AC) described under 3, 1.7 parts by weight of a commercial, amine-blocked dodecylbenzenesulfonic acid (DDBSA) catalyst, 3.0 parts by weight of the CAB solution (C) described under 6, 14.0 parts by weight of the aluminum effect pigment paste described under 7, and 6.4 parts by weight of butyl acetate.

The resulting comparative metallic basecoat material BC-1 has a spray viscosity of 21 sec in the Ford 3 viscosity cup (23° C.) and a solids content of 40.2% by weight (1 h/125° C.).

9. Preparation of the Inventively Useful Metallic Basecoat Material BC-2 (with Polyester and with Hydrophilic Melamine)

The metallic basecoat material BC-2 is prepared by mixing and homogenizing the following constituents:

10.0 parts by weight of the wax dispersion (W) described under 1, 22.0 parts by weight of the polymer microparticles (M) described under 2, 11.5 parts by weight of Resimene® 755 (commercial monomeric hydrophilic hexamethoxy-methyl/butyl-melamine resin from Ineos Melamines), 8.0 parts by weight of the stabilized inorganic particles (N) described under 4, 0.5 part by weight of a commercial, silicone-free wetting additive based on an amine resin-modified acrylic copolymer, 0.8 part by weight of a commercial, hydroxyphenyl-benzotriazole-based UV absorber, 17.0 parts by weight of the acrylate binder (AC) described under 3, 3.3 parts by weight of the polyester binder (PE) described under 5, 117 parts by weight of a commercial, amine-blocked dodecylbenzenesulfonic acid (DDBSA) catalyst, 3.0 parts by weight of the CAB solution (C) described under 6, 14.0 parts by weight of the aluminum effect pigment paste described under 7, and 8.1 parts by weight of butyl acetate.

The resulting metallic basecoat material BC-2 has a spray viscosity of 22 sec in the Ford 3 viscosity cup (23° C.) and a solids content of 41.2% by weight (1 h/125° C.).

10. Preparation of the Inventively Useful Metallic Basecoat Material BC-3 (without Polyester and with Hydrophobic Melamine)

The metallic basecoat material BC-3 is prepared by mixing and homogenizing the following constituents:

10.0 parts by weight of the wax dispersion (W) described under 1, 22.0 parts by weight of the polymer microparticles (M) described under 2, 11.8 parts by weight of Cymel 1156 (commercial monomeric hydrophobic hexamethoxybutyl-melamine resin from Cytec Specialties), 8.0 parts by weight of the stabilized inorganic particles (N) described under 4, 0.5 part by weight of a commercial, silicone-free wetting additive based on an amine resin-modified acrylic copolymer, 0.8 part by weight of a commercial, hydroxyphenyl-benzotriazole-based UV absorber, 22.0 parts by weight of the acrylate binder (AC) described under 3, 1.7 parts by weight of a commercial, amine-blocked dodecylbenzenesulfonic acid (DDBSA) catalyst, 3.0 parts by weight of the CAB solution (C) described under 6, 14.0 parts by weight of the aluminum effect pigment paste described under 7, and 6.1 parts by weight of butyl acetate.

The resulting metallic basecoat material BC-3 has a spray viscosity of 21 sec in the Ford 3 viscosity cup (23° C.) and a solids content of 40.8% by weight (1 h/125° C.).

11. Preparation of the Inventive Metallic Basecoat Material BC-4 (with Polyester and with Hydrophobic Melamine)

The metallic basecoat material BC-4 of the invention is prepared by mixing and homogenizing the following constituents:

10.0 parts by weight of the wax dispersion (W) described under 1, 22.0 parts by weight of the polymer microparticles (M) described under 2, 11.8 parts by weight of Cymel 1156 (commercial monomeric hydrophobic hexamethoxybutyl-melamine resin from Cytec Specialties), 8.0 parts by weight of the stabilized inorganic particles (N) described under 4, 0.5 part by weight of a commercial, silicone-free wetting additive based on an amine resin-modified acrylic copolymer, 0.8 part by weight of a commercial, hydroxyphenyl-benzotriazole-based UV absorber, 17.0 parts by weight of the acrylate binder (AC) described under 3, 3.3 parts by weight of the polyester binder (PE) described under 5, 1.7 parts by weight of a commercial, amine-blocked dodecylbenzenesulfonic acid (DDBSA) catalyst, 3.0 parts by weight of the CAB solution (C) described under 6, 14.0 parts by weight of the aluminum effect pigment paste described under 7, and 7.8 parts by weight of butyl acetate.

The resulting inventive metallic basecoat material BC-4 has a spray viscosity of 20 sec in the Ford 3 viscosity cup (23° C.) and a solids content of 40.7% by weight (1 h/125° C.).

12. Production of Multicoat Paint Systems M-1 to M-8

For the testing of the adhesion of glazing bonding before and after condensation exposure, the OEM paint systems M-1 to M-4 of the example coating materials BC-1 to BC-4 were produced in a standard way on test panels with dimensions of 20×40 cm. For this purpose, cathodically electrocoated panels were coated with a commercial, conventional, gray, polyester-based surfacer from BASF Coatings AG, after which the resulting surfacer films were flashed off for 5 minutes at 20° C. and a relative humidity of 65% and baked in a forced-air oven for 5 minutes at 165° C. panel temperature.

After the test panels have been cooled to 20° C., in a first series, basecoat materials BC-1 to BC-4 were applied using automatic ESTA (electrostatic) spraying units in a wedge application in dry film thicknesses of 0-40 µm. Thereafter the basecoat films were flashed off for 5 minutes and overcoated with a commercial high-solids 1K clearcoat material from BASF Coatings AG, with a dry film thickness of 25 µm. Thereafter the basecoat films and the clearcoat films were baked for 10 minutes at 140° C. panel temperature.

In a second series, the OEM paint systems M-5 to M-8 of example coating materials BC-1 to BC-4 were applied to the cooled test panels by automatic ESTA (electrostatic) spraying units with a constant dry film thickness of 25 µm. Subsequently the basecoat films were flashed off for 5 minutes and overcoated with a commercial high solids 1K clearcoat from BASF Coatings AG, by ESTA wedge application, with a dry film thickness of 0-50 µm. Thereafter the basecoat films and the clearcoat films were baked for 10 minutes at 140° C. panel temperature.

13. Production and Testing of Multilayer Coatings M-1 to M-8

To produce the multilayer coatings M-1 to M-8, the test panels coated with multicoat paint systems M-1 to M-8 were stored at room temperature for 24 hours and then the glass bonding compound Betaseal® 1858-1 (moisture-curing, isocyanate-based adhesive, commercially available from Dow Automotive), was applied in stripes over the complete clearcoat of the multicoat systems M-1 to M-8 in the lengthwise direction (approximately 3 mm thick, 10 mm wide). The adhesive is allowed to cure for 72 hours at 50% humidity and 25° C.

Following complete curing of the adhesive, a quick knife test is carried out. This is done by placing cuts at intervals of 12 mm vertically with respect to the adhesive and pulling manually on the cured adhesive in the lengthwise direction. If, in the course of this procedure, there is exclusively a tear within the adhesive, then the adhesive/multicoat paint system interlayer adhesion, and hence also the adhesion of glazing bonding, are considered to be sufficient. If there is adhesive/clearcoat delamination or a fracture within the multicoat paint system, then the adhesion of glazing bonding is no longer sufficient. Since the adhesion of glazing bonding is typically a problem particularly in the case of a relatively high basecoat film thickness and/or a relatively low clearcoat film thickness, the thickness of basecoat (M-1 to M-4) or of clearcoat (M-5 to M-8) at which delamination first occurs is reported.

The adhesion of glazing bonding is tested in this way at room temperature and before condensation exposure. In addition, the adhesion of glazing bonding is also tested after condensation exposure. For this purpose, the multilayer coatings M-1 to M-8 are stored in a condensation apparatus for 14 days at 40° C. and 100% relative humidity. After 2 hours of regeneration, the above-described quick knife test is carried out on the exposed multilayer coatings M-1 to M-8.

Table 1 summarizes the results of the quick knife test for the multicoat systems of comparative coatings M-1 and M-5 and also of the multilayer coatings M-2 to M-4 and M-6 to M-8.

TABLE 1

Results of the quick knife test for the multicoat systems of comparative coatings M-1 and M-5 and of multilayer coatings M-2 to M-4 and M-6 to M-8.

| Multilayer coating | Basecoat material | PE binder | Melamine | Film thickness basecoat [μm] | Film thickness clearcoat [μm] | MVVS in accordance with Ford WSK-M11P75-A1 | |
|---|---|---|---|---|---|---|---|
| | | | | | | before condensation | after condensation |
| M-1 | BC-1 | No | hydrophilic | 0-40 | 25 | <24 | <20 |
| M-2 | BC-2 | Yes | hydrophilic | 0-40 | 25 | <30 | <26 |
| M-3 | BC-3 | No | hydrophobic | 0-40 | 25 | <29 | <27 |
| M-4 | BC-4 | Yes | hydrophobic | 0-40 | 25 | <35 | <31 |
| M-5 | BC-1 | No | hydrophilic | 25 | 0-50 | >27 | >33 |
| M-6 | BC-2 | Yes | hydrophilic | 25 | 0-50 | >17 | >19 |
| M-7 | BC-3 | No | hydrophobic | 25 | 0-50 | >20 | >22 |
| M-8 | BC-4 | Yes | hydrophobic | 25 | 0-50 | >12 | >15 |

Table 1 shows that the adhesion of glazing bonding of the multilayer coatings M-2 to M-4 is good at a relatively low clearcoat film thickness (25 μm) even without use of an adhesion primer and up to a relatively high basecoat film thickness (26 μm to 35 μm), whereas the adhesion of glazing bonding in the comparative coating M-1 is sufficient only up to basecoat films with a thickness of a maximum of 24 μm or a maximum of 20 μm (after condensation exposure). The multilayer coatings M-2 to M-4 therefore exhibit improved adhesion of glazing bonding, both before and after condensation exposure. Particularly good adhesion of glazing bonding is shown by multilayer coating M-4, whose basecoat material comprises not only a polyester binder having a hydroxyl number of more than 240 mg KOH/g and an acid number of not more than 10 mg KOH/g but also exclusively fully butylated melamine resins.

Table 1 additionally shows that the adhesion of glazing bonding of multilayer coatings M-6 to M-8 is good at a relatively high basecoat film thickness (25 μm) even without the use of an adhesion primer and down to a relatively low clearcoat film thickness (22 μm to 12 μm), whereas the adhesion of glazing bonding in the comparative coating M-5 is sufficient only in the case of clearcoat films with a thickness of at least 27 μm or at least 33 μm (after condensation exposure). The multilayer coatings M-6 to M-8 therefore exhibit improved adhesion of glazing bonding, both before and after condensation exposure. Particularly good adhesion of glazing bonding is shown by multilayer coating M-8, whose basecoat material comprises not only a polyester binder having a hydroxyl number of more than 240 mg KOH/g and an acid number of not more than 10 mg KOH/g but also exclusively fully butylated melamine resins.

The results show unambiguously that, through the use of a polyester binder in the basecoat material with an OH number of 280 mg KOH/g and/or the sole use of hydrophobic, fully butylated melamine resins, it is possible to improve the adhesion of glazing bonding in the case of high basecoats and/or low clearcoats. The combination of the two modifications cited above results in a particularly pronounced improvement in the adhesion of glazing bonding. The adhesion of glazing bonding is improved significantly both before and after condensation exposure, without the need to use an additional adhesion primer.

What is claimed is:

1. A multilayer coating comprising:
   (A) a multicoat paint system comprising:
      (A1) at least one basecoat of a basecoat material that is water-free and comprises:
         at least one amino resin that is a fully methylolated, fully etherified melamine resin in which at least 90% of the etherified methylol groups are etherified with butanol,
         at least 1.0% by weight, based on the total weight of the basecoat material, of at least one polyester binder having a hydroxyl number of at least 240 mg KOH/g and an acid number of not more than 10 mg KOH/g,
      (A2) at least one clearcoat as a topmost coat of the multicoat paint system; and
   (B) an adhesive layer of a moisture-curing, isocyanate-based adhesive directly atop the clearcoat;
   wherein the basecoat material comprises no further amino resins.

2. The multilayer coating of claim 1, wherein the at least one amino resin present in the basecoat material (A1) comprises at least 95% of butanol-etherified methylol groups, based on all of the etherified methylol groups.

3. The multilayer coating of claim 1, wherein the basecoat material (A1) comprises 8% to 15% by weight, based on the total weight of the basecoat material, of the melamine resin.

4. The multilayer coating of claim 1, wherein the basecoat material (A1) comprises 1% to 6% by weight, based on the total weight of the basecoat material, of said at least one polyester binder.

5. The multilayer coating of claim 1, wherein said at least one polyester binder has a hydroxyl number of 270 mg KOH/g to 300 mg KOH/g and an acid number of not more than 5 mg KOH/g.

6. The multilayer coating of claim 1, wherein said at least one polyester binder comprises structural units which originate from aliphatic, cycloaliphatic and/or aromatic dicarboxylic and/or polycarboxylic acids and from diols and/or polyols.

7. The multilayer coating of claim 1, wherein said at least one polyester binder has a weight-average molecular weight of 400 to 2500 g/mol.

8. The multilayer coating of claim 1, which has precisely one basecoat having a dry film thickness of 10 to 25 μm and precisely one clearcoat having a dry film thickness of 25 to 70 μm.

9. The multilayer coating of claim 1, wherein the at least one polyester has an acid number of from 2.2 mg KOH/g to not more than 5 mg KOH/g.

10. The multilayer coating of claim 1, wherein the basecoat material (A1) comprises, by weight:
  (i) 8% to 15% of the melamine resin;
  (ii) 1% to 6% of the one polyester binder;
  (iii) 10% to 30% of a further binder; and
  (iv) 30% to 70% of an organic solvent.

11. The multilayer coating of claim 1, wherein said at least one basecoat (A1) has a dry film thickness of 10 to 25 μm.

12. The multilayer coating of claim 11, wherein said at least one basecoat (A1) has a dry film thickness of 15 to 25 μm.

13. The multilayer coating of claim 1, wherein said at least one clearcoat has a dry film thickness of 25 to 50 μm.

14. The multilayer coating of claim 13, wherein said at least one clearcoat has a dry film thickness of 25 to 45 μm.

15. A basecoat material for producing a multilayer coating, the basecoat material being water-free and comprising:
  (i) at least one amino resin that is a fully methylolated, fully etherified melamine resin in which at least 90% of the etherified methylol groups are etherified with butanol, and
  (ii) at least 1.0% by weight, based on the total weight of the basecoat material, of at least one polyester binder having a hydroxyl number of at least 240 mg KOH/g and an acid number of not more than 10 mg KOH/g,
wherein the basecoat material comprises no further amino resins.

16. The basecoat material of claim 15 comprising, by weight:
  (i) 8% to 15% of the melamine resin;
  (ii) 1% to 6% of the one polyester binder;
  (iii) 10% to 30% of a further binder; and
  (iv) 30% to 70% of an organic solvent.

* * * * *